US008001338B2

(12) United States Patent
Moscibroda et al.

(10) Patent No.: US 8,001,338 B2
(45) Date of Patent: Aug. 16, 2011

(54) MULTI-LEVEL DRAM CONTROLLER TO MANAGE ACCESS TO DRAM

(75) Inventors: Thomas Moscibroda, Redmond, WA (US); Onur Mutlu, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 713 days.

(21) Appl. No.: 11/842,772

(22) Filed: Aug. 21, 2007

(65) Prior Publication Data

US 2009/0055580 A1   Feb. 26, 2009

(51) Int. Cl.
*G06F 12/00* (2006.01)
(52) U.S. Cl. ........................ 711/158; 711/104
(58) Field of Classification Search .................. 711/158, 711/104
See application file for complete search history.

(56) References Cited

U.S. PATENT DOCUMENTS

| | | | |
|---|---|---|---|
| 5,630,096 | A | 5/1997 | Zuravleff et al. |
| 5,713,037 | A | 1/1998 | Wilkinson et al. |
| 6,839,797 | B2 | 1/2005 | Calle et al. |
| 6,944,730 | B2 | 9/2005 | Lai et al. |
| 7,127,574 | B2 | 10/2006 | Rotithor et al. |
| 7,149,857 | B2 | 12/2006 | Jeddeloh |
| 7,178,004 | B2 | 2/2007 | Polansky |
| 7,194,561 | B2 | 3/2007 | Weber |
| 2005/0198413 | A1 | 9/2005 | Moyer |
| 2006/0248261 | A1 | 11/2006 | Jacob et al. |
| 2007/0005934 | A1 | 1/2007 | Rotithor et al. |
| 2007/0011396 | A1 | 1/2007 | Singh et al. |
| 2007/0283356 | A1 * | 12/2007 | Du et al. ........................ 718/102 |

OTHER PUBLICATIONS

International Search Report and Written Opinion mailed Feb. 27, 2009 for PCT Application No. PCT/US2008/072276, 12 pages.
Sven Heithecker and Rolf Ernst, "Traffic Shaping for an FPGA based SDRAM Controller with Complex QoS Requirements", Institute of Computer and Communication Network Engineering Technical University of Braunschweig, 34.5, DAC 2005, Jun. 13-17, 2005, Anaheim, California, USA http://delivery.acm.org/10.1145/1070000/1065729/p575-heithecker.pdf?key1=1065729&key2=2495585811&coll=GUIDE&dl=GUIDE&CFID=25437816&CFTOKEN=72657958.
Aristides Nikologiannis, "Efficient Per-Flow Queueing in DRAM at OC-192 Line Rate using Out-of-Order Execution Techniques", ICS, Forth, Nov. 2000, 104 pages. http://archvlsi.ics.forth.gr/muqpro/qmDRAM_niko_tr279.pdf.
W. Lin, S. Reinhardt, D. Burger, "Reducing DRAM Latencies with an Integrated Memory Hierarchy Design," In Proc. 7 th Int symposium on High-Performance Computer Architecture, Jan. 2001. http://www.ece.umd.edu/courses/enee759h.S2003/references/HPCA01.pdf.

* cited by examiner

*Primary Examiner* — Yong Choe
(74) *Attorney, Agent, or Firm* — Turocy & Watson, LLP

(57) ABSTRACT

Providing for multi-tiered RAM control is provided herein. As an example, a RAM access management system can include multiple input controllers each having a request buffer and request scheduler. Furthermore, a request buffer associated with a controller can vary in size with respect to other buffers. Additionally, request schedulers can vary in complexity and can be optimized at least for a particular request buffer size. As a further example, a first controller can have a large memory buffer and simple scheduling algorithm optimized for scalability. A second controller can have a small memory buffer and a complex scheduler, optimized for efficiency and high RAM performance. Generally, RAM management systems described herein can increase memory system scalability for multi-core parallel processing devices while providing an efficient and high bandwidth RAM interface.

12 Claims, 11 Drawing Sheets

MULTI-LEVEL DRAM CONTROLLER TO MANAGE ACCESS TO DRAM

BACKGROUND

For many decades, performance capabilities of electronic processing devices have increased due to various hardware enhancements in such devices (e.g., increased clock frequencies and reduction in calculation time, more efficient processor management architecture). Typically, such increases have been related to improved single-thread performance (e.g., sequential processing). In recent years, however, the complexity of such processors as well as limits on power consumption and heat generation have made further enhancement of single-thread performance increasingly difficult. As a result, processor manufacturers have begun to integrate multi-thread processing (e.g., multiple processors on a chip) to increase system performance in a power efficient manner.

Current high performance general purpose computers can have at least two processors on a single chip. Further, industry trends suggest that integrating even more cores on a single chip will occur in the near future. As a result, processors with many cores on a single chip are likely to be commonplace.

As the capacity for parallel processing increases, computer memory (e.g., random access memory (RAM), dynamic RAM (DRAM) etc.) can potentially become an efficiency bottleneck. For instance, RAM is typically a shared resource that handles all memory requests by processor threads. As parallel processing increases, a concurrent number of such memory requests served by the RAM can substantially increase as well.

In modern computing architectures, a RAM controller is a mediator between processors and RAM modules (and data stored therein). The RAM controller satisfies the processors' memory requests while obeying timing and resource constraints of RAM banks, chips, and address/data buses. To do so, the controller translates processor requests in RAM commands. Two basic architectures are involved within the RAM controller. First, a memory request buffer receives and stores memory requests generated by a processor(s) or processing thread(s). Once stored in a buffer, the request awaits scheduling to an appropriate RAM chip, where data is extracted to serve the memory request. In addition, the memory request buffer maintains a state associated with each memory request. The state can include characteristics such as memory address, type, request identifier, age of the request, RAM bank readiness, completion status, and so on.

In addition, a RAM controller generally has a RAM access scheduler. The purpose of such a scheduler is to select, among all requests currently in the memory request buffer, the request that is sent to the RAM memory chip next. More precisely, the RAM access scheduler decides which RAM command to issue in every RAM clock cycle. It consists of logic that keeps track of RAM state (e.g., data stored in buffers, RAM bus, etc.) and timing constraints of the RAM. The scheduler takes as input the state of the memory requests in the request buffer along with the state of the RAM, and decides which RAM command should be issued based on the implemented scheduling and access prioritization policies (e.g., where such scheduling and policies typically try to optimize memory bandwidth and latency).

In order to maintain efficient data bandwidth to and from RAM, complex RAM request scheduling (as opposed to simple or primitive request scheduling) is typically employed. A complex RAM request scheduling algorithm operates on a memory request buffer and employs a sophisticated hardware algorithm to select requests for service Selection is typically based on maximization of RAM bandwidth or minimization of RAM latency (in contrast, a simple/primitive scheduling algorithm does not try to maximize RAM bandwidth or minimize RAM latency.) Use of sophisticated hardware algorithms does have a cost, however. For instance, implementation difficulty and power consumption for complex schedulers can be proportional to the size of the memory request buffer. If a scheduler attempts to accommodate larger and larger numbers of concurrent incoming requests (e.g., as a result of incorporating a large memory request buffer), scheduling complexity, and therefore hardware implementation complexity, power consumption, and logic delay of the scheduler can increase linearly, or even super-linearly, with the increased number of requests. Therefore, it can be very difficult and costly, in terms of design complexity, design time, and power consumption, to increase the size of the memory request buffer while using complex scheduling algorithms.

As parallel processing (e.g., number of processing cores on a chip), and hence multiple threads sharing RAM resources, becomes more prevalent, the size of the memory request buffer should increase so that system performance can scale to meet parallel processing demands (e.g., to reduce a likelihood that the memory request buffer becomes a performance bottleneck). In addition, to maintain high RAM bandwidth and minimize RAM latency, complex and sophisticated RAM scheduling algorithms optimized for such purposes should be retained. Unfortunately, utilizing a complex scheduling algorithm in conjunction with a large request buffer can substantially increase implementation, design, test, verification, and/or validation complexity as well as power consumption for a RAM memory controller. As a result, overall system scalability for parallel processing architectures can be significantly hindered.

The eventual result of increased parallel processing, with current RAM limitations, is stalled processing. The more memory requests issued by multi-core processors the faster that RAM request buffers will fill up. When such buffers are full, new memory requests cannot be admitted and hence, no thread is able to issue any new memory requests. A processing thread that is unable to fulfill a memory request in cache, for instance, and therefore must generate a memory request, will be stalled until a free slot in the memory request buffer becomes available. Overall system performance will be substantially reduced in such circumstances. Consequently, new RAM interface mechanisms that employ both large memory request buffers and complex scheduling algorithms will likely be required in order to facilitate efficient system performance in respect of foreseeable growth in parallel processing.

SUMMARY

The following presents a simplified summary in order to provide a basic understanding of some aspects of the claimed subject matter. This summary is not an extensive overview. It is not intended to identify key/critical elements or to delineate the scope of the claimed subject matter. Its sole purpose is to present some concepts in a simplified form as a prelude to the more detailed description that is presented later.

Providing for multi-tiered RAM control is provided herein. As an example, a RAM management system can have multiple input controllers each having a request buffer and at least one request scheduler. Furthermore, the request buffer and request scheduler of the multiple input controllers can vary in size and complexity from controller to controller. A first controller can have a large request buffer and simple scheduling algorithm optimized for managing large numbers of requests, for instance. Further, a second controller can have a small request buffer and a complex scheduling algorithm, optimized for obtaining high RAM performance. Such a RAM management system can increase scalability for multi-core parallel processing while maintaining efficient and high bandwidth RAM interfaces. It should also be appreciated that such a system can be implemented via various hardware logic (e.g., gates, circuits, transistors, wires, and so on) components, alone or in conjunction with software and/or firmware.

Also provided is a routing manager for a multi-tiered RAM control system as described herein. For instance, a scheduling component can receive RAM data requests and determine a most appropriate controller for each request. As an example, the scheduling component can consider a scheduling algorithm or current buffer load of each controller, state of RAM buffer(s), or the like, to determine an appropriate controller for each request. To facilitate efficient handling of RAM requests, each processor can forward requests to a predetermined controller that can directly fulfill buffered requests, or forward requests to other controllers based on a scheduling algorithm of such other controller, for instance. As a result, the scheduling component and multi-tiered controllers can provide increased efficiency in scheduling RAM requests as compared with conventional scheduling mechanisms.

The following description and the annexed drawings set forth in detail certain illustrative aspects of the claimed subject matter. These aspects are indicative, however, of but a few of the various ways in which the principles of the claimed subject matter may be employed and the claimed subject matter is intended to include all such aspects and their equivalents. Other advantages and distinguishing features of the claimed subject matter will become apparent from the following detailed description of the claimed subject matter when considered in conjunction with the drawings.

DETAILED DESCRIPTION

Figure 1:
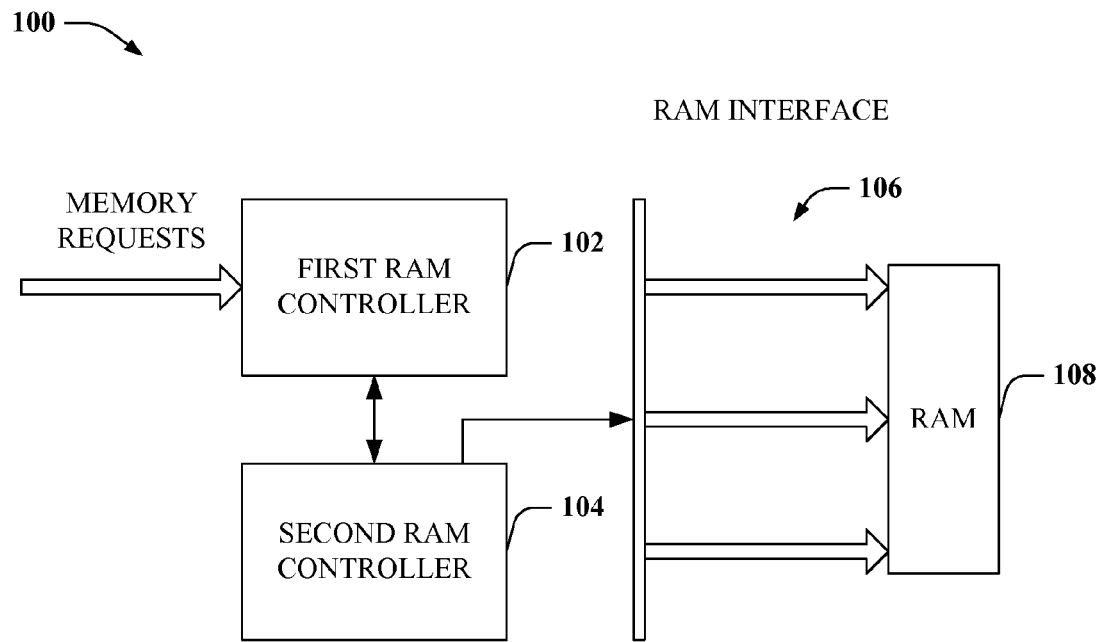
FIG. 1 illustrates a RAM request management system in accordance with one or more aspects disclosed herein.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, well-known structures and devices are shown in block diagram form in order to facilitate describing the claimed subject matter.

In order to facilitate efficient processor/memory interface for advanced parallel processing architectures (e.g., having one or more processors, processor cores and/or processing threads), a memory request buffer should scale with an increase in parallel processing capability. However, increased buffering can inject a great deal of additional complexity into request scheduling. In order to alleviate scalability and flexibility problems, multi-level RAM controllers are provided. Instead of using a single, larger buffer to store memory requests, a series of multi-level buffers having one or more schedulers can be utilized.

A multi-level controller can have a memory request buffer and a request scheduler at each level. In addition, the buffers can be of varying sizes, and request schedulers can employ various algorithms for scheduling requests within a controller's buffer. According to one aspect, a RAM data request will be received at a top-level controller and stored in a buffer of the top-level controller. When a top-level scheduler schedules a certain request, R for instance, the request R is removed from the top-level memory request buffer and inserted into a memory buffer of a next lower level controller. This procedure can be repeated at each level.

As a more generic example of the foregoing, if the request R is in a memory request buffer of an Mth-level controller, as long as an Mth-level scheduler selects a request other than the request R, request R will remain in the Mth-level memory buffer. When the Mth-level scheduler selects request R, such request is removed from the Mth-level buffer and inserted into an (M-1)th-level buffer of a (M-1)th-level memory controller. A request that reaches the lowest level controller can be scheduled by the low-level scheduler (e.g., a RAM scheduler) to be sent to the RAM memory and serviced in an appropriate RAM bank. Therefore, according to certain aspects, the lowest level RAM memory controller in a multi-level RAM controller can have a substantially similar function as a conventional RAM memory controller.

It should be appreciated that any number of controllers (and, e.g., corresponding RAM request buffers and schedulers) are contemplated as part of the subject disclosure. In addition, the size of a memory request buffer at each level controller can vary. For instance, in a 3-controller system, the memory request buffers of the 3 controllers can all be of different sizes, a same size, or two (in any order) can be the same while a third is different, and so on. Additionally, a scheduler at each level can employ varying scheduling algorithms for prioritizing (e.g., selecting) memory requests stored in associated request buffers.

As used in this application, the terms "component," "module," "system", "interface", or the like are generally intended to refer to a computer-related entity, either hardware, a combination of hardware and software, software, or software in execution. For example, a component may be, but is not limited to being, an electronic logic gate(s), circuit(s), transistor(s), or the like, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers. As another example, an interface can include I/O components as well as associated processor, application, and/or API components, and can be as simple as a command line or a more complex Integrated Development Environment (IDE).

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Moreover, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

As used herein, the terms to "infer" or "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Referring to FIG. 1, a system 100 is depicted that provides a multi-level access interface to RAM. Particularly, multiple general access RAM controllers can be utilized for managing RAM data requests from one or more processors, threads of execution, or processor cores. Furthermore, each suitable processor, core, thread etc. can issue memory requests to the multi-level controller (102, 104) system (100).

System 100 can include a first RAM controller 102 that receives one or more memory requests initiated by at least a portion of a processing device. The RAM controller 102 can store the memory requests in a queue, or memory buffer, to await execution. Such memory buffer can be at least large enough to store all memory requests delivered by the processing device within a threshold period, for instance. For example, the threshold period can be established based on a typical speed with which RAM (108) can fulfill such memory requests and/or a typical rate that the processing device can generate such requests. The processing device can be any suitable commercial or industrial-class processor such as a single-thread processor, a multi-thread processor, a two-core processor, a four core processor, and so on, as well as a multi-chip processing architecture (e.g., two or more processing chips, where each chip can be single or multi-threading, or have one or more cores).

First RAM controller 102 can select a memory request stored therein for advancement to a second RAM controller 104, if such second RAM controller 104 has room to store the memory request. Selection of one request stored at the first RAM controller 102 can be based on numerous selection algorithms, described herein or known in the art. For instance, a first come first serve (FCFS) algorithm can be employed, that selects a memory request for advancement that has been stored within the first RAM controller 102 for the longest period of time (e.g., the oldest request stored within the controller (102)).

Alternatively, or in addition to the above, an alternating priority round robin (R-R) algorithm can be employed to select a memory request stored within the first RAM controller 102. The R-R algorithm periodically (e.g., after a predetermined number of RAM or system clock cycles) grants higher selection priority to a processing thread. The algorithm proceeds in a round-robin fashion until each thread has been prioritized for a period. When each thread has been prioritized for a period, a prioritization round ends and the R-R algorithm begins a new round, and once again prioritizes each thread for a period. Selection of threads for prioritization within a round can be random or in a determined order.

As an example to illustrate the foregoing, an R-R algorithm can choose from threads 1 through T, where T is an integer, for prioritization. If the R-R algorithm selects thread T, all memory requests generated by thread T will receive priority for one period (e.g., 1000 RAM cycles). During the period, the R-R algorithm first selects memory requests stored at the controller (102) generated by thread T, and advances those threads (e.g., to the second RAM controller 104). If multiple memory requests issued by thread T are stored in the first RAM controller 102 concurrently, the oldest such thread can be advanced first. If no thread T memory requests are stored at the controller (102), then the R-R algorithm can select the oldest memory request stored in the controller (102) for advancement, independent of a thread that issued the request. After the period ends in which thread T is prioritized, the R-R algorithm will select another thread (e.g., threads 1 through T-1) for prioritization for another period (e.g., 1000 RAM cycles). Once all threads have been prioritized for one period, a round ends, and the R-R algorithm can start a new round and re-prioritize each of threads 1 through T for a period.

In one embodiment, the R-R algorithm, discussed above, can prioritize each thread for one period where all periods are of equal duration. According to further embodiments, the R-R algorithm can implement more complex prioritization schemes by making rounds of some threads longer than rounds of other threads (e.g., depending on a number of stored memory requests generated by each thread, a number of memory requests being generated by each thread, a priority parameter issued by a thread). In general, the R-R algorithm introduces a fairness principle so that each thread receives priority in advancement of requests from the first RAM controller 102. As a result, the R-R algorithm can help to avoid requests being stalled in the first RAM controller for longer than a round. In contrast, conventional controllers can often result in requests of a particular thread being stalled for extended periods, depending on a state of RAM modules, and a priority algorithm being utilized to schedule requests.

A selection algorithm employed at the first RAM controller can typically be designed to be simple enough to implement with a large memory request buffer (to satisfy desirable power consumption and scheduling delay parameters), although it should be appreciated that any algorithm described herein or known in the art can be utilized instead (or, e.g., in addition or in combination with such algorithm). Once a memory request is selected for advancement from first RAM controller 102, the memory request is sent to the second RAM controller 104. Second RAM controller 104 also can store memory requests and schedule such requests for advancement out of the controller (104) (e.g., to be serviced at RAM 108). According to particular embodiments, second RAM controller 104 can have a smaller storage buffer than first RAM controller 102, and a more complex scheduling algorithm that facilitates high memory bandwidth and low latency. As a result, system 100 can queue much larger numbers of memory requests, as compared with conventional RAM controllers, without having to increase implementation complexity and power consumption of associated scheduling algorithms. Therefore, system 100 can scale to accommodate advanced parallel processing architectures that generate more memory requests than conventional architectures, as well as mitigate processor stalling.

As a specific example, second RAM controller 104 can employ a first ready, first come first serve (FR-FCFS) scheduling algorithm. The FR-FCFS algorithm selects memory requests stored in the second RAM controller 104 to be sent via a RAM interface 106 to a RAM module 108. The RAM module 108 can be any suitable type of RAM for a processing environment (see below). RAM interface 106 can also be any suitable form of memory bus structure that facilitates data transfer between RAM controller (102, 104) and RAM module 108 based on a predetermined addressing architecture (see, e.g., FIG. 2, infra).

The FR-FCFS scheduler is optimized for maximizing throughput to RAM 108, because it favors memory requests that access an address already stored in a row buffer (e.g., see FIG. 2, infra) of the RAM module 108. Such requests that access an address already stored in a row buffer are called row-hit (or row match) requests. As a result, delays in closing an open RAM row buffer, identifying a particular portion of RAM (108) where desired data is located, and loading the desired data into the row buffer can be mitigated if such a match occurs. The FR-FCFS algorithm prioritizes memory requests stored in RAM controller 104 as follows: first, higher priority is given to requests that would be serviced faster. Consequently, a request for data already loaded into a RAM (108) row buffer (e.g., a row match request) is serviced first. Typically, the oldest row match request is serviced before other row match requests. Optionally, requests for RAM (108) banks (e.g., see FIG. 2, infra) whose row buffers are empty (e.g., a row-empty request or an empty row match request), involving less service delay than if the row buffer and request involve a data mismatch, can be serviced next. Typically, the oldest row-empty request is serviced before other row-empty requests. Finally, if no row-hit or row-empty requests are identified, the oldest request stored in the controller (104) (called a row-conflict request or a row mismatch request) is selected next.

The FR-FCFS algorithm is more complex than the FCFS or the R-R algorithms because an open row address in each memory bank of the RAM module 108 is compared to a row address of each request prior to selecting the memory request. The second RAM controller 104 can be searched associatively with each open row address to determine whether a request is a row-hit (row match), row-empty (empty row match), or a row-conflict (row mismatch). As a result, implementing FR-FCFS can become very complex if implemented on a large request buffer. For example, implementing such a complex scheduling logic can take longer, which could increase design, test, and implementation time (e.g., time-to-market) and associated monetary overhead costs of the processing system. In addition, complexities of the scheduling logic could increase power consumption in the memory system. Moreover, delay and complexity of an associated search can have detrimental effects on memory bandwidth, latency, and overall performance. Thus, system 100 can typically utilize a relatively simple scheduling algorithm and large storage buffer for the first RAM controller 102, and a small storage buffer with a complex, optimized algorithm in the second RAM controller 104.

By utilizing multi-level memory controllers, system 100 can combine and employ different scheduling algorithms in a single processor\RAM interface. This can be a significant advantage over conventional interfaces because each algorithm can have its own advantages and disadvantages. In addition, the advantages and disadvantages of scheduling algorithms often depend on the size of an associated memory storage buffer. By utilizing separate controllers, system 100 can pair an algorithm with a buffer in a manner that can optimize performance. Therefore, by enabling use of different algorithms at different levels, the strengths of each algorithm can be combined without having to endure significantly increased complexity, additional logic, and power consumption associated with scaling to larger buffer sizes in conventional controllers. It is to be appreciated that an architecture described by system 100 can be utilized to interface with any suitable RAM module 108, including synchronous RAM (SRAM), dynamic RAM (DRAM), synchronous DRAM (SDRAM), double data rate SDRAM (DDR SDRAM, including DDR2 SDRAM and DDR3 SDRAM), enhanced SDRAM (ESDRAM), Synchlink DRAM (SLDRAM), and direct Rambus RAM (RDRAM).

Figure 2:
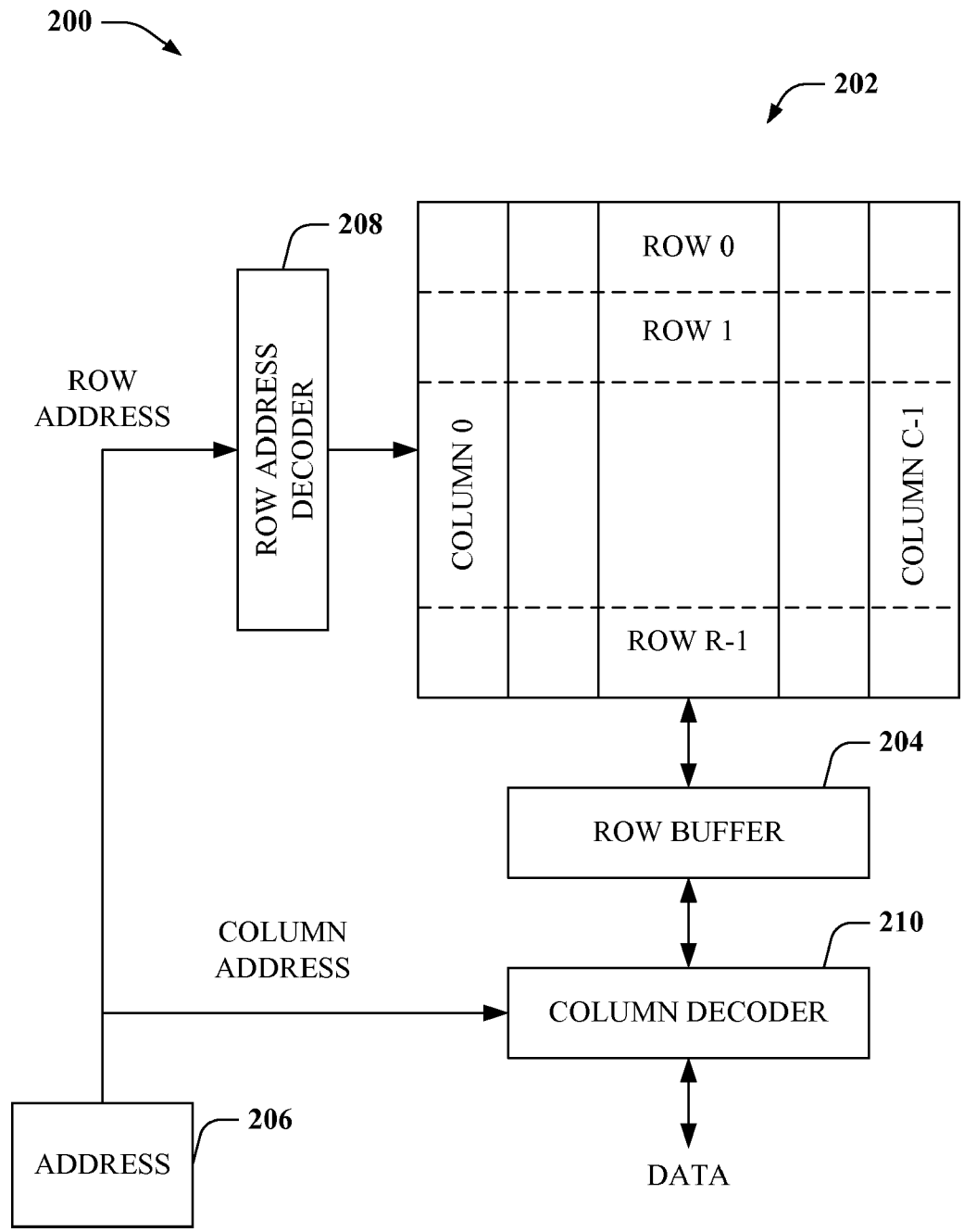
FIG. 2 depicts a sample interface for retrieving data from RAM to fulfill RAM data requests.

Referring now to FIG. 2, an example system 200 of an interface for retrieving data from a RAM bank (202, see also FIGS. 6, 7, and 8 for a depiction of multiple RAM banks) to fulfill RAM data requests is illustrated. The interface can be a typical memory access interface (e.g., RAM interface 106 can be substantially similar to Interface 200 in one or more embodiments) utilizing a data address to identify data stored in rows or columns of the RAM bank 202. Each RAM bank 202 of a RAM module (not depicted) can have various rows and columns. For instance, a bank (202) can consist of R-1 rows and C-1 columns, where R and C are integers. Each row (row 0 through row R-1) can be uniquely identified to distinguish between rows. Further, each column (column 0 through column C-1) can be uniquely identified to distinguish between columns. In addition, for many types of RAM (e.g., DRAM) consecutive addresses in memory are located in consecutive columns of a single row. The size of a row can vary, but is often between 512 bytes and 32 kilo (K) bytes in common DRAM. For example, for a RAM bank (202) having 32-byte level two (L2) cache blocks, a row contains 16-1024 L2 cache blocks. Further, data can be stored at any of such columns/rows, or groups of such columns/rows.

As depicted at system 200, an address 206 (e.g., contained within a memory request) can indicate an appropriate column and row of memory bank 202 where requested data is stored.

The address specifies a row of the memory bank 202, received and translated by a row address decoder 208, and a column of the memory bank 202, received and translated by a column decoder 210. If a row specified in the address 206 matches a row contained in row buffer 204, the memory request can be expedited, as discussed below. As a result, a typical controller that schedules memory requests directly to a memory bank (e.g., a RAM controller, or a lowest level RAM controller in a multi-tiered controller as described herein) can associatively compare addresses stored within a controller buffer to an address stored within row buffer 204 to identify any potential row matches.

An order in which RAM memory requests are scheduled by a controller (e.g., second RAM controller 104 of FIG. 1, supra) can be an important factor in memory performance and thread fairness. Bank 202 has one row buffer 204. In typical memory architecture, data requested by a memory request can only be fulfilled by what is concurrently stored within the row buffer 204. In addition, row buffer 204 contains at most a single row of data at any given time (due to the row buffer 204, modern RAM is not truly random access, where equal access time to all locations in a memory array are provided). Access to data can fall into one of three categories: a row match (e.g., row-hit, see above), an empty row match (e.g., row-empty, see above), and a row mismatch (e.g., row-conflict above).

A row match can occur where a memory request identifies a row that is currently stored in row buffer 204. A column included in the request can simply be read directly from or written directly into (e.g., column access) the row buffer 204. A row match results in lowest latency memory retrieval (e.g., 15 to 50 nanoseconds (ns) for typical DRAM, which can include data transfer time, translating to 45-150 processor cycles for a processor, core, thread, etc., operating at 3 gigahertz (GHz) clock frequency).

An empty row match can occur where a memory request identifies a memory bank (202) with an empty row buffer 204. A row buffer 204 of a memory bank 202 can be empty when a RAM memory controller closes an open row in the row buffer 204 (e.g., a controller could close a row for various reasons, including power conservation). In such a case, a desired row identified in a memory request has to be loaded into row buffer 204 (e.g., a row access) and then a column access from the buffer can be performed to retrieve/write data from/to the desired column. Although an empty row match is not serviced as quickly as a row match is, the empty row match can often be serviced more quickly than a row mismatch, described below. Specifically, because there is no need to first write a current row in the row buffer 204 back into the memory bank 202 before a row access can be performed, an empty row match request can often be fulfilled with less latency than a row mismatch request.

Typically, a row mismatch involves the highest latency for fulfilling a memory request. As a result, complex scheduling algorithms, such as an FR-FCFS algorithm, will give row mismatch requests a lower priority over row match or optionally over empty row match requests, in order to facilitate servicing a maximum amount of requests in a threshold period of time. For the row mismatch scenario, a requested row address is to a row different from that currently stored in the row buffer 204. The row stored in the buffer (204) must first be written back into the memory bank 202 (e.g., a row close) before a row access, that retrieves a requested row, can be performed. Finally, a column access to the row buffer 204 is performed to retrieve/write to an appropriate column identified by the memory request. Latency for a row mismatch can typically be much higher than that for a row match, often 50 to 100 ns or 150-300 processor cycles for a processor operating at 3 GHz.

As described, sequential memory requests identifying a single row stored in row buffer 204 are serviced with low latency, whereas sequential memory requests to different rows of bank 202 are serviced with substantially higher latency. Consequently, latency is a function of the current state of a RAM memory system. In order to optimize memory bandwidth and minimize latency, complex schedulers (e.g., employing a FR-FCFS algorithm) schedule requests to a single row in a bank before scheduling access to a different row in a bank, even if requests associated with the different row(s) were received earlier. To do so, the scheduler searches a controller buffer to identify a row associated with each queued request. Doing so requires additional complex logic, however, that depends directly on the size of the buffer. Increasing size of a memory buffer paired with a complex algorithm can linearly or super-linearly (e.g., any suitable relationship that results in faster increase in complexity than a proportional increase in buffer size) increase the complexity of implementing the algorithm in hardware, increase design, and testing, validation, and/or verification costs, increase power consumption, and/or reduce memory performance. As a result, multi-tiered memory controllers described herein can provide a substantial benefit by utilizing different scheduling algorithms. Particularly, each controller/level can have a scheduling algorithm that is optimal for an associated buffer size, providing scalability for storing increased numbers of memory requests while mitigating performance degradation.

Figure 3:
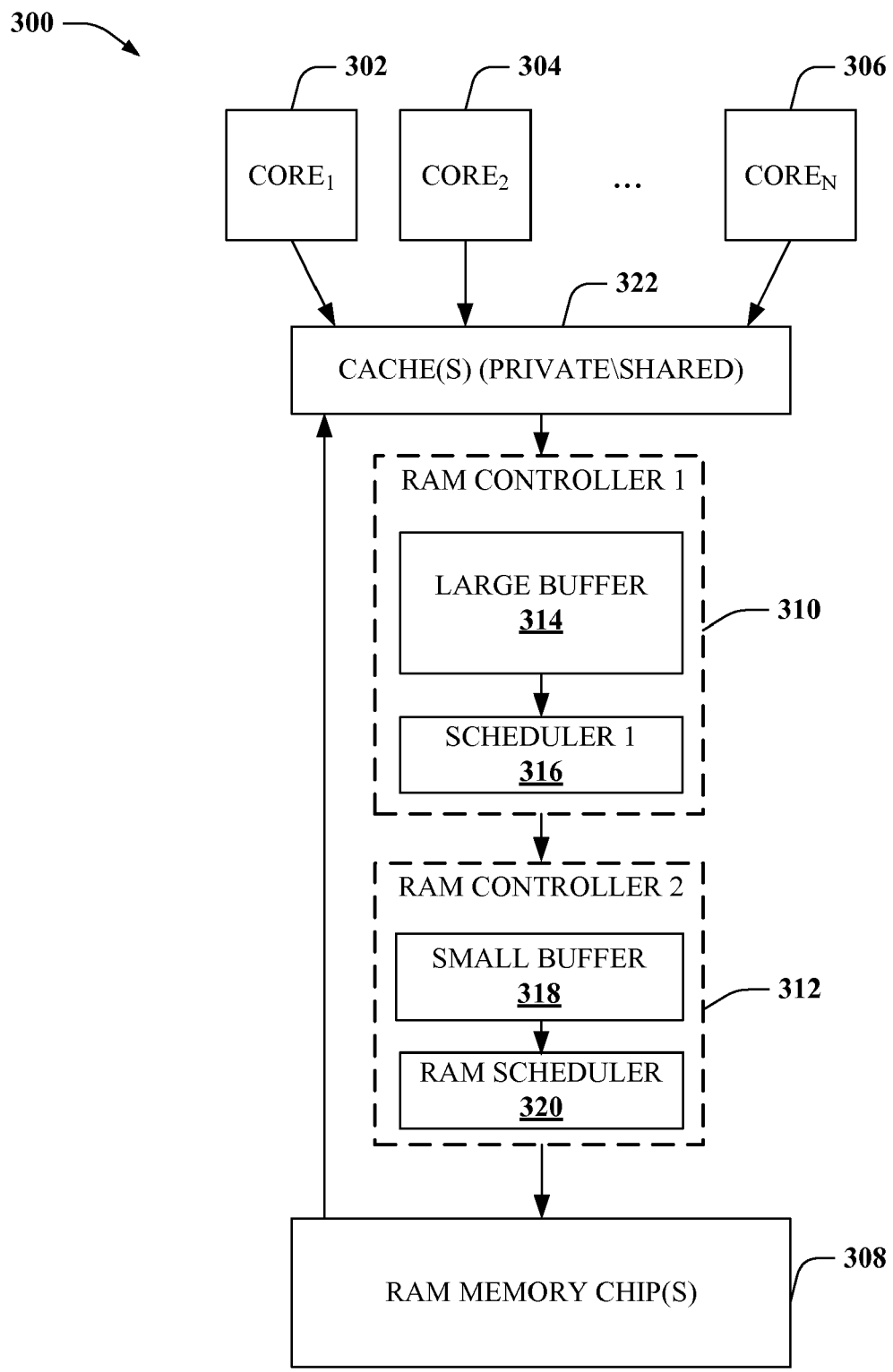
FIG. 3 depicts a sample multi-tier RAM management system for buffering and scheduling RAM data requests.

FIG. 3 illustrates a sample system 300 having multi-tiered memory management architecture in accordance with one or more aspects of the subject disclosure. System 300 can include multiple processing cores, specifically core, 302, $core_2$ 304, through $core_N$ 306, where N is an integer. In addition, each core (302, 304, 306) can generate multiple memory requests (e.g., concurrent with another core(s)) to retrieve and/or write to data, as described herein and/or known in the art.

A memory request generated by a processor core (302, 304, 306) is first sent to cache 322. Cache 322 can be separate memory modules appropriated privately to each processor core (302, 304, 306), or can be shared amongst all processor cores (302, 304, 306), for instance. Cache 322 typically stores data commonly utilized by an application, thread, etc., currently and/or commonly run on the cores (302, 304, 306). If data required by a memory request is stored within cache 322, the request can be fulfilled without accessing RAM 308. If not, the memory request is sent to a multi-tiered RAM controller (310, 312) of system 300.

System 300 contains two separate RAM controllers, RAM controller 1 310 and RAM controller 2 312. In addition, each RAM controller (310, 312) has a memory request buffer (314, 318) and a scheduler (316, 320). Furthermore, the buffers (314, 318) can be of any suitable size, and the schedulers (316, 320) can employ various suitable algorithms of differing complexity.

According to particular embodiments, the multi-tiered controller (310, 312) will pair a scheduling algorithm with a buffer size that is optimal for such scheduling algorithm. For example, RAM controller 1 310 can have a large memory request buffer 314, and can employ a simple algorithm (e.g., FCFS or R-R algorithms, or a combination of these or like simple algorithms) that scales well with large numbers of stored memory requests (e.g., a large memory request buffer size). For example, an FCFS scheduler simply identifies the earliest memory request contained within the large buffer 314 and selects it for advancement. Each memory request received and stored in the large buffer 314 can be prioritized as a function of time received, length stored therein, or the like. As a result, scheduler 1 316 can base selection solely on such priority (e.g., maintained in a look-up table, or stored in a particular priority, see FIG. 6 supra). Efficiency of an FCFS algorithm is typically independent of a number of memory requests stored in the large buffer 314, or of the size of the large buffer 314. Therefore, RAM controller 1 310 can be highly scalable and accommodate large numbers of memory requests without suffering from unreasonably high implementation complexity, power consumption, or design, test, verification, and/or validation complexity.

According to additional embodiments, RAM controller 2 312 can utilize a highly optimized and complex scheduling algorithm at RAM scheduler 320, to maximize memory bandwidth and minimize latency. In addition, RAM controller 2 312 can couple a small memory buffer 318 with such a RAM scheduler 320 to mitigate implementation, test, verification, and/or validation complexities as well as high power consumption associated with conventional mechanisms (e.g., as a result of associative searches through large numbers of memory requests stored in a large buffer (318) to identify row matches and/or empty row matches as described at FIG. 2, supra). According to particular embodiments, small buffer 318 can be substantially the same size as or smaller than conventionally sized RAM controller buffers, to maximize RAM bandwidth and minimize RAM latency without decreasing scalability.

Upon selection of a memory request within the small buffer 318, RAM controller 2 312 forwards the selected memory request to a RAM bank (not depicted, but see FIGS. 6, 7, and 8) of RAM memory chip(s) 308. In similar fashion as described with respect to FIG. 2, supra, the memory request can be fulfilled and requested data and/or acknowledgement of a RAM write operation can be sent to cache 322. As a result, system 300 can provide substantial scalability while improving or maintaining memory performance and mitigating implementation complexities, described herein, and increased power consumption that typically results from utilizing complex scheduling algorithms in conjunction with a single large memory request buffer (e.g., as in conventional systems).

Figure 4:
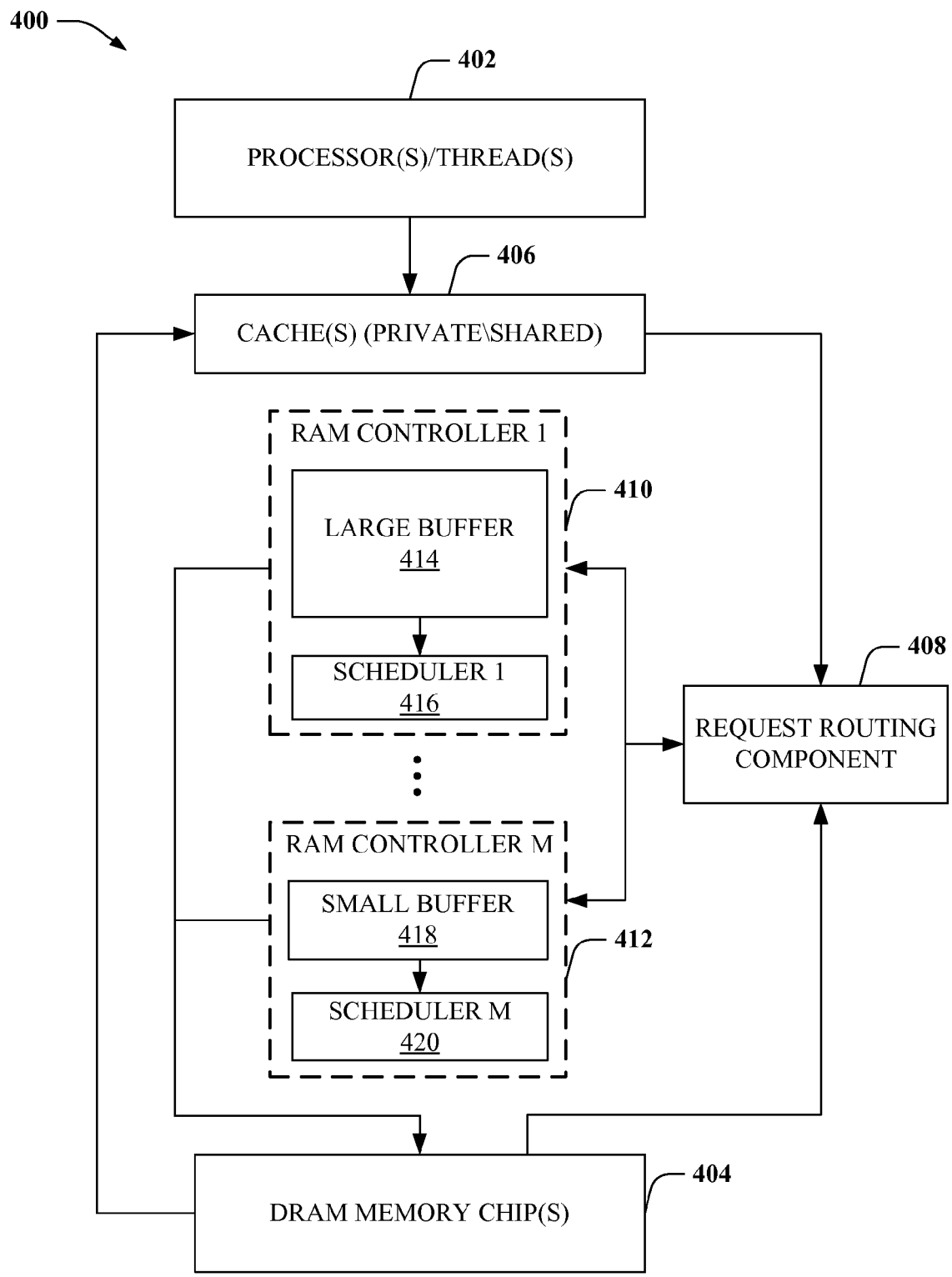
FIG. 4 illustrates an alternate RAM management system according to one or more aspects.

Referring to FIG. 4, a system 400 is depicted that provides memory request scheduling and alternate access to RAM according to one or more additional aspects of the subject disclosure. System 400 can include one or more processors, processor cores, and/or threads of execution that can generate requests for memory. Such requests can be forwarded to a DRAM memory chip(s) 404 (e.g., by way of a RAM controller) if unable to be fulfilled by processor cache 406, as described above or known in the art.

If a memory request cannot be fulfilled in cache 406, such request is provided to a request routing component 408. Request routing component 408 directs the memory request to one of multiple RAM controllers (410, 412) or controller levels (410, 412) of a multi-tiered controller system (410, 412). In addition, routing component 408 can determine a controller/controller level (410, 412) for a thread based at least in part upon a scheduling algorithm or a request load associated with such controller(s)/controller level(s) (410, 412). Alternatively, or in addition, states of DRAM memory chip(s) 404 (e.g., a state can comprise a list of rows currently stored within row-buffers of various memory banks of the chip(s) 404) can be periodically provided (e.g., by controllers 410, 412 or DRAM chip(s) 408) to the request routing component 408, and the above determination can be based at least in part upon such state(s).

As a particular example to illustrate aspects of system 400, but not to be construed as limiting system 400 to such aspects specifically articulated, request routing component 408 can reference a type of scheduling algorithm utilized by RAM controller 410 and/or 412 to determine which controller (410, 412) a particular memory request should be routed to. For instance, if a processor/thread 402 indicates a memory request has high priority, the memory request can be sent to a scheduler employing a complex algorithm optimized for memory performance and high bandwidth. Alternatively, request routing component 408 can route the memory request to a buffer (414, 418) having the smallest number of requests stored therein, in order to expedite the memory request. As a further example, a state(s) of the DRAM memory chip(s) 404 can be provided to request routing component 408 and a determination can be based on such state(s). More particularly, if the memory request matches (or, e.g., is estimated to match) a row stored in a row buffer (or, for example, if there are no requests waiting for a particular RAM bank that the request needs to access), the request can be sent to small buffer 418 paired with a scheduler (416, 420) employing a FR-FCFS algorithm. Such a scheduler will likely expedite the memory request due to the row match (or empty bank). If, instead, the memory request does not match a row buffer, the request can be sent to a large buffer 414 paired with a scheduler (416) that employs a FCFS algorithm, for instance. Alternatively, the memory request can be sent to a controller (410, 412) that employs a fairness algorithm (e.g., an R-R algorithm, or like algorithm such as a fair queuing algorithm, a fair memory algorithm, a random selection algorithm that selects from queued requests randomly, or a stall-time fair memory algorithm, or a combination of such algorithms) to mitigate request stalling as described herein.

System 400 can also include a multi-tier/multi-controller RAM control architecture (410, 412). Such architecture can employ a plurality of controllers/levels, including RAM controller 1 410 through RAM controller M 412, where M is an integer. In addition, each controller (410, 412) can have a memory buffer (414, 418) of varying size, and a scheduler employing various scheduling algorithms, independent of a buffer size and/or algorithm utilized by each other controller (410, 412). Furthermore, each controller (410, 412) can pair a particular scheduling algorithm that is optimal for a size of buffer (414, 420) utilized by the controller (410, 412), as described herein.

System 400 also provides general access to DRAM memory chip(s) 404 from each RAM controller 410, 412. For instance, RAM controller 1 410 can schedule stored memory requests directly to the DRAM (404). Alternatively, RAM controller 1 410 can schedule such requests to fill an empty slot in a lower level buffer (e.g., small buffer 418) of a lower level controller (e.g., RAM Controller M 412, or an intermediate controller). Further, intermediate level controllers (not depicted) and the low-level controller (412) can schedule memory requests directly to the DRAM (404) where appropriate, or schedule such requests to a lower level controller. As a result, low latency memory requests can be fulfilled in an expedited fashion at various controller levels where suitable.

Figure 5:
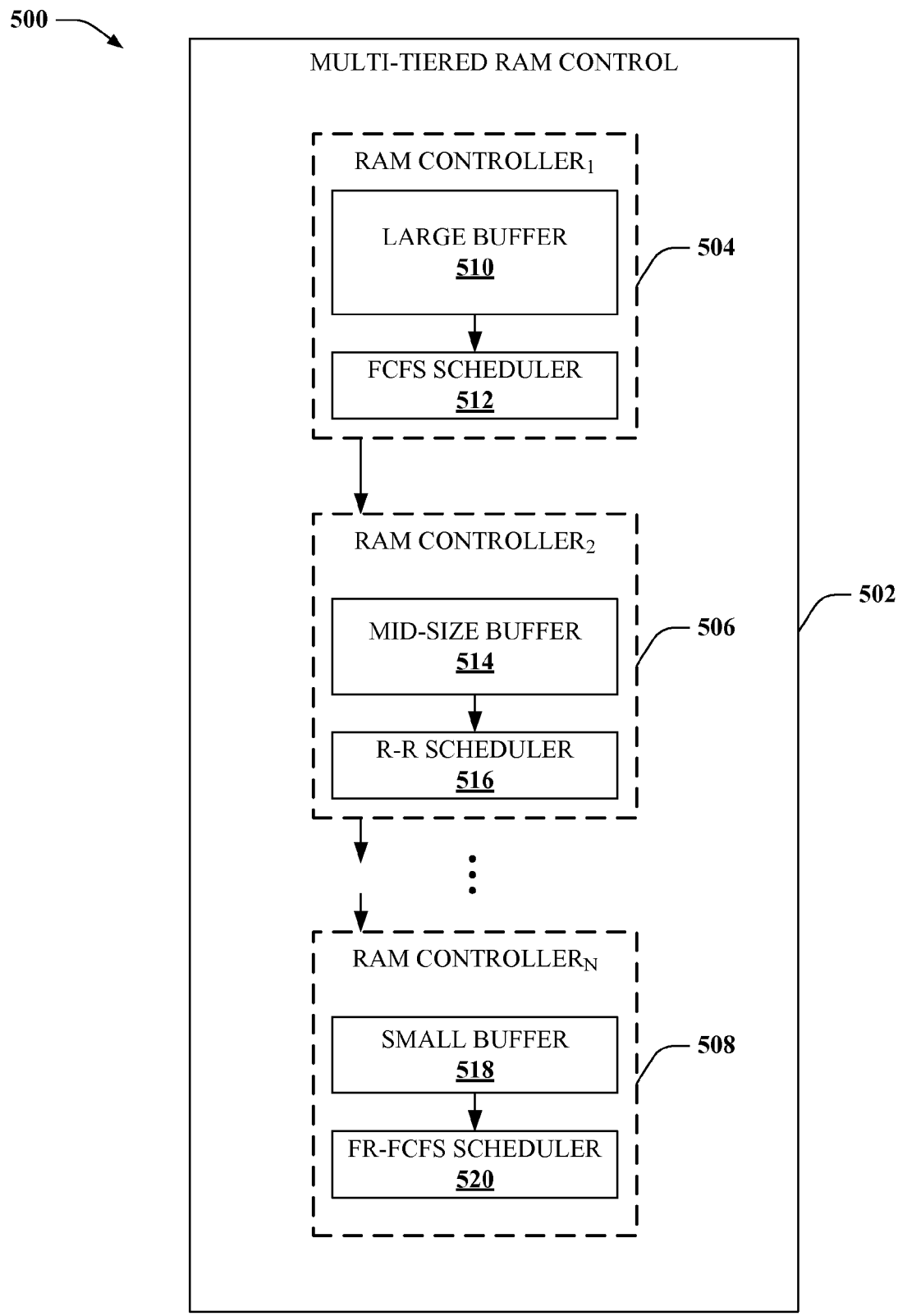
FIG. 5 depicts an example of interactions between multi-tier RAM controllers in accordance with additional aspects.

Referring to FIG. 5, a system 500 representing an example multi-tiered RAM controller 502 is depicted. System 500 can be incorporated into various other systems (e.g., 100, 300, 400, etc.) as suitable. Particularly, multi-tier RAM control 502 can include two or more RAM controllers that utilize a top-down scheduling approach, and can incorporate simple, fairness-based, and memory performance optimized scheduling algorithms. Additionally, multi-tier RAM control 502 can pair each scheduling algorithm with an appropriate size buffer (510, 514, 518) to optimize the strengths of each algorithm and mitigate implementation, test, validation, and verification complexity of the control 502.

Multi-tier RAM control 502 can facilitate high request scalability because it can employ a very large memory request buffer (510) (e.g., a size of which can scale with a number of cores on a chip, a number of chips, a number of consecutive processing threads, and so on) at a highest level controller (504). The high-level controller 504 can employ a simple, FCFS scheduler 512 that can easily be scaled to large buffer (510) sizes. In addition, the lowest level controller (e.g., RAM controller$_N$ 508) can employ a highly complex and optimized scheduler (e.g., FR-FCFS scheduler 520 or a like scheduler optimized for high memory performance and low latency) to provide efficient scheduling resulting in good memory-related performance. Furthermore, one or more mid-level controllers (506) can be employed utilizing a fairness scheduling algorithm (516) that helps to mitigate stalling for requests associated with one or more threads. For instance, an R-R scheduler 516 can be employed that gives each thread priority, thereby periodically expediting requests generated by each thread. As a result, at least once in a 'round' (e.g., where a round is equal to a period, discussed above with at FIG. 1, multiplied by a number of threads) requests generated by each thread will be advanced more quickly to a lower level controller.

Multi-tier RAM control 502 can provide various benefits over conventional RAM controls. First, control 502 can mitigate processor stalling due to a full memory request buffer. Specifically, a top-level controller (504) can employ a large buffer 510 to enable the control 502 to scale with increased parallel processing. Therefore, one of the major advantages of the multi-tier RAM control 502 is the increased scalability of the memory controller while preserving or improving controller performance. In addition, control 502 can provide high scheduling efficiency at a smaller implementation complexity and smaller power consumption. The small buffer 518 can enhance scheduling efficiency of the FR-FCFS scheduler 520. Specifically, conventional controllers are typically of a relatively large size in an attempt to avoid processor stalling due to a full memory request buffer. As a result, an FR-FCFS scheduler 520 in a conventional system will require a larger number of hardware gates and wires and will have to perform more calculations when an associated buffer (518) is relatively full. However, small buffer 518 can be much smaller than conventional control buffers due to the additional buffering provided by the high-level controller (504) and intermediate controller(s) (506). As a result, the FR-FCFS scheduler can have higher power-efficiency, lower implementation, design, test, verification and/or validation complexity, and/or smaller power consumption in a multi-tier controller than in a conventional controller. Therefore, as compared with conventional memory controllers, the multi-tier memory controller (502) can have relatively low complexity (as described herein) and relatively low power consumption while providing high performance and scalability.

Multi-tier RAM control 502 also provides increased flexibility compared with conventional controllers. Because multiple buffers can be utilized in conjunction with the multiple controllers/levels (504, 506, 508), control 502 is not limited to utilizing a single scheduling algorithm. Instead, multiple algorithms targeting different purposes can be employed. For instance, an intermediate scheduler (516) can provide fairness. Fairness among multiple threads has become an increasingly large problem in RAM controllers, causing thread stalling. For instance, a highly optimized FR-FCFS scheduler 520 gives priority to memory requests that match a row stored within a row buffer, as described at FIG. 2, supra. If a particular thread continuously sends memory requests that match stored rows, those requests can continuously be given priority over requests of other threads, resulting in stalling for such other threads. By employing an R-R scheduler 516 as an intermediate scheduler, control 502 can facilitate advancement of requests from all threads to the FR-FCFS scheduler 520 to mitigate such stalling.

As an alternate example, an intermediate controller (506) can provide prioritization. For instance, some requests can have higher priority than others have (e.g., if they are issued by a high priority thread, or a high priority application run on a particular core, or the like). Consequently, such requests should be serviced more rapidly to comply with the higher priority. An intermediate scheduler (516) could alternatively schedule requests according to a priority scheme to facilitate rapid service for the higher priority threads. System 500 therefore, can provide substantial flexibility, scalability, and additional performance benefits over conventional RAM control systems.

Figure 6:
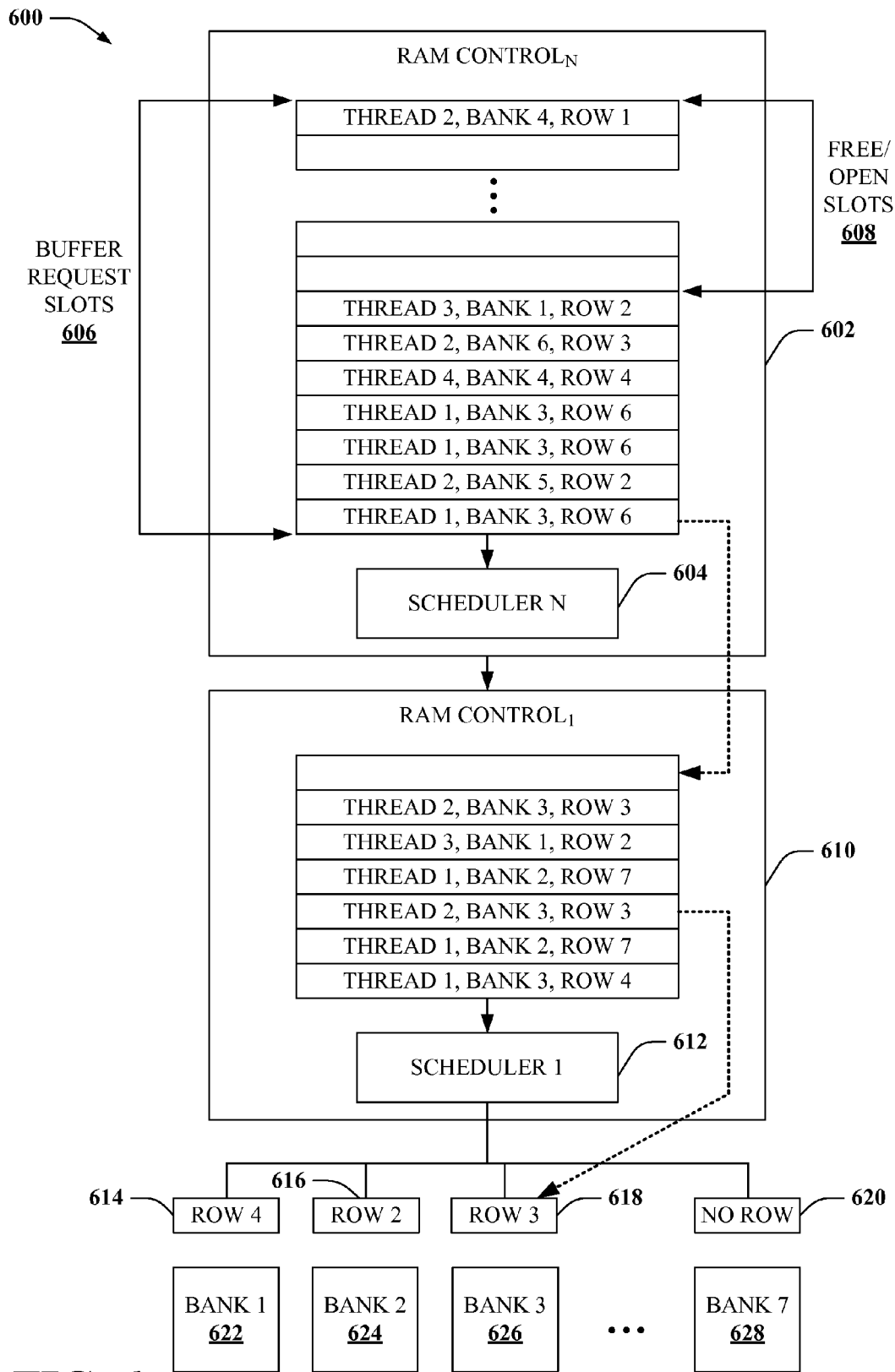
FIGS. 6-8 depict an example RAM management system according to further aspects.
Figure 7:
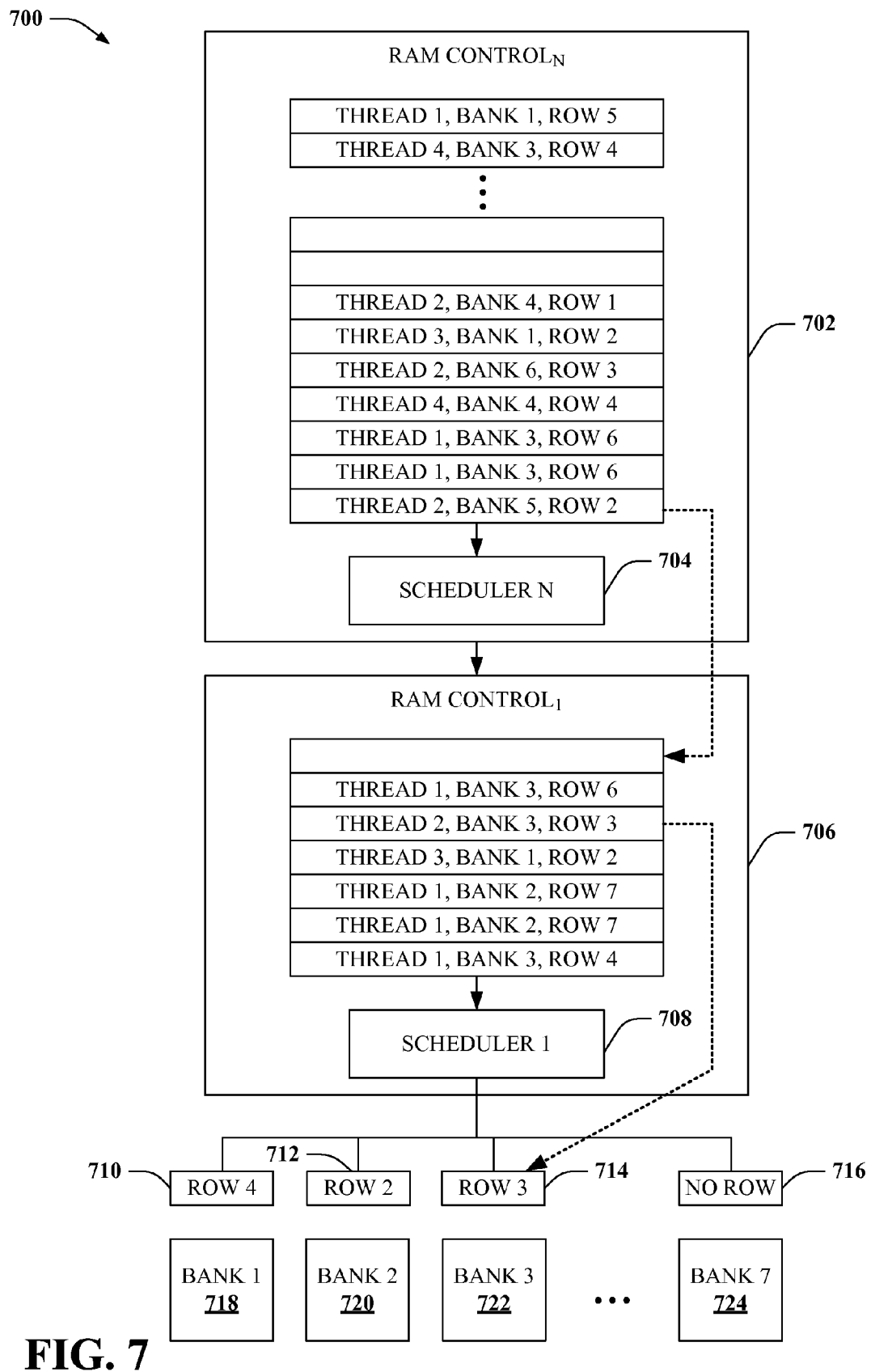
Figure 8:
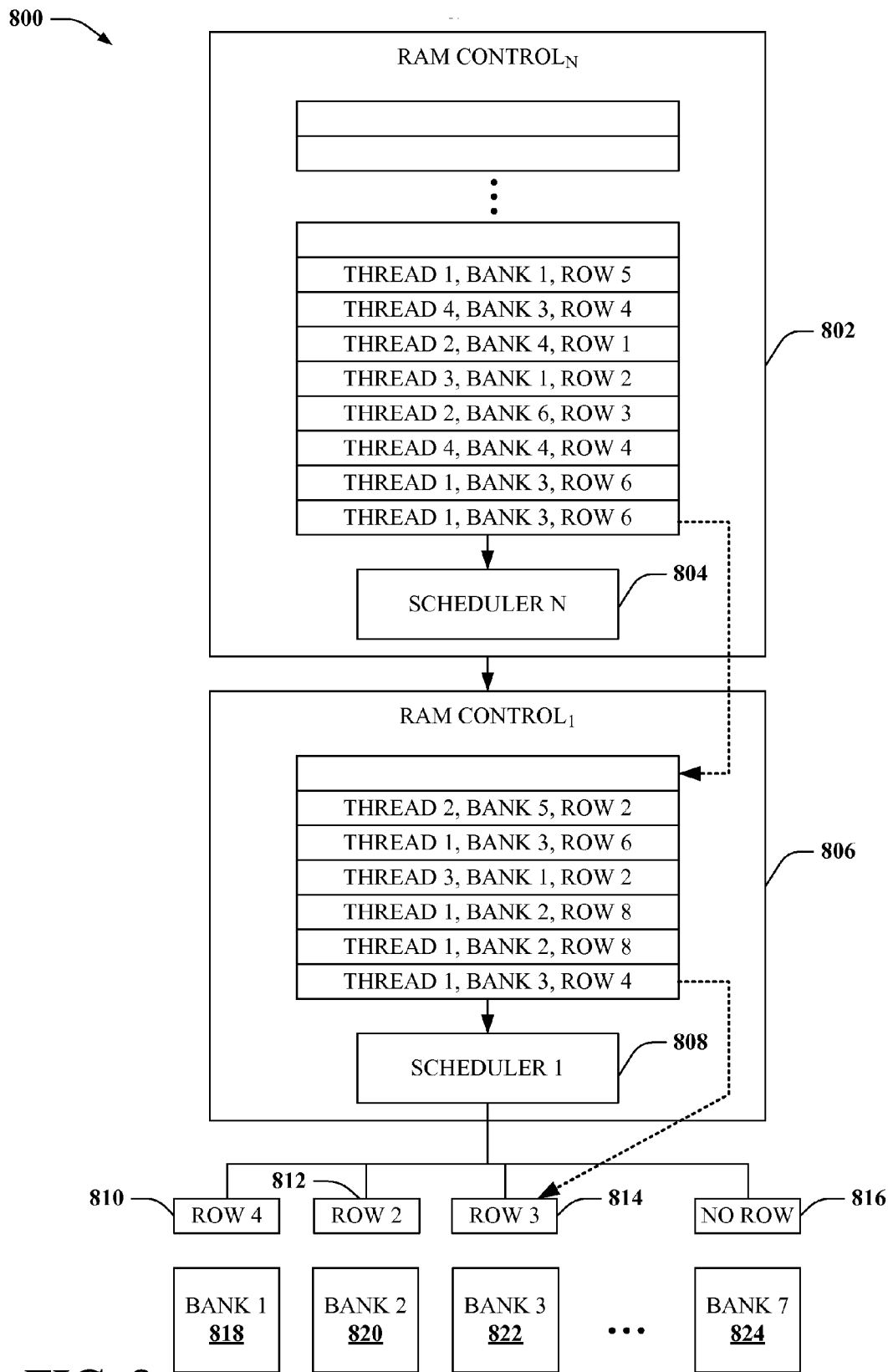

FIGS. 6 through 8 depict an example multi-tier RAM control system (600, 700, 800) and various memory requests issued to such controller. The FIGs. (6 through 8) provide an example of memory request flow through a multi-tiered system as described herein. It should be appreciated that FIGS. 6 through 8 are example illustrations only, and are not to be construed as to limit the scope of the subject disclosure. Rather, like example embodiments made known to one of skill in the art by way of the context provided by the example (s) articulated herein are incorporated into the subject specification.

System 600 can include N RAM controllers (602, 610), where N is an integer. A highest level controller, RAM Control$_N$ 602, employs a large memory buffer (606, 608) that can accommodate high parallel processing, as described herein. The memory buffer contains a plurality of memory requests stored therein, and ordered within the buffer as a function of when they were received at RAM Control$_N$ 602. For instance, received requests can be stored in one of the buffer request slots 606 in an order of receipt. Consequently, the request associated with "thread 1, bank 3, row 6" at the bottom of the RAM Control$_N$ 602 buffer will be the oldest received request in the buffer. Further, a memory request received most recently can be at a first free slot 608 (e.g., until it is filtered down to the lowest free slot). As depicted, the request associated with "thread 2, bank 4, row 1" depicted at the top free slot 608 has been just received.

RAM Control$_N$ 602 includes a scheduler N 604 that employs the FCFS scheduling algorithm. The FCFS algorithm removes the oldest thread from the lowest buffer request slow (606) if a free slot is available in a lower controller (610). Because a free slot is available in a lower controller (610), the "thread 1, bank 3, row 6" request stored in the lowest slot (606) of RAM Control$_N$ 602 can be removed and forwarded to the lower controller (610) by scheduler N 604.

System 600 can include various intermediate controllers (not depicted) from an (N-1)th controller to a 2nd controller. Each intermediate controller can employ varying sized buffers, and can pair the varying sized buffers with various types of scheduling algorithms, including complex optimized algorithms, simple scalable algorithms, as well as fairness algorithms and/or prioritization algorithms as described herein. Typically, a large buffer will be paired with a simple scalable algorithm and a small buffer will be paired with a complex algorithm to provide optimal scalability, performance, and implementation complexity.

RAM Control$_1$ 610 can receive memory requests from scheduler N 604. Such memory requests can be placed into a highest free buffer request slot within RAM Control$_1$ 610 and moved down to a lowest free slot, for instance. In addition, RAM Control$_1$ 610 includes scheduler 1 612 that employs the FR-FCFS scheduling algorithm. Scheduler 1 612 therefore attempts to identify stored memory requests within RAM Control$_1$ 610 that match a memory row stored in a row buffer (614, 616, 618, 620) of a memory bank (622, 624, 626, 628). If a row-buffer/memory request match is found, the memory request is selected first by scheduler 1 612, even if other requests had been received prior to the matching (e.g., row-hit) request. For instance, the request that is in the third slot from the bottom of RAM Control$_1$ 610, "thread 2, bank 3, row 3," requests the third row of the third memory bank. Buffer 618 corresponding to memory bank 3 626 currently has row 3 loaded. Therefore, the "thread 2, bank 3, row 3" memory request is a row match and can be selected as soon as buffer 618 is ready to accommodate a new memory request (e.g., not serving another memory request, or not loading a row into the row buffer 618 or not writing to/reading from memory bank 3 626, etc.)

It is noted that RAM Control$_1$ 610 currently contains two requests that are both a row match (in the third slot from the bottom and in the top-most filled slot). In such a case, the first received row match request can be given priority, followed by the second received row match, etc. In addition to the foregoing, scheduler 1 612 can give an intermediate level of priority to empty row matches stored in RAM Control$_1$ 610. For instance, row buffer 620 associated with bank B 628 currently has an empty buffer. As a result, a memory request directed at Bank B 628 can be serviced more quickly than a row mismatch in some circumstances. As a result, such request can be given priority over a row mismatch, but under a row match. Thus, according to at least one embodiment scheduler 1 612 can select all requests resulting in a row matches first (in order of first received row match), then all requests resulting in an empty row match (in order of first received empty row match), and finally select all row mismatch requests in order of receipt.

FIG. 7 depicts a system 700 similar to system 600, but in a different state. For example, the most recently received request (thread 2, bank 4, row 1) in RAM Control$_N$ 602 has been moved down to the lowest free spot in the storage buffer of RAM Control$_N$ 702. In addition, two additional memory requests have been received at RAM Control$_N$ 702, a "thread 4, bank 3, row 4" request and a "thread 1, bank 1, row 5" request, in that order of receipt. Furthermore, the memory request in the third lowest slot of RAM Control$_1$ 610, (resulting in a row match), has been serviced and consequently removed from the request buffer slots of RAM Control$_1$ 706. In addition to the foregoing, the topmost full buffer slot of RAM Control$_1$ 706 contains the memory request (thread 1, bank 3, row 6) selected by scheduler N 610, right below an empty slot resulting from servicing the row match request.

Scheduler N 704, employing the FCFS algorithm, will insert the next highest priority (e.g., oldest or first received) request within the buffer of RAM Control$_N$ 702 into the free slot of RAM Control$_1$ 706 (as indicated by the upper dashed arrow). Scheduler 1 708, employing the FR-FCFS algorithm, identifies a row match (to bank 3 722) at the second highest (oldest) buffer slot of RAM Control$_1$ 706, and immediately services such memory request (as indicated by the lower dashed arrow). Following such activity, the state of the system (700) is represented by system 800 of FIG. 8.

System 800 depicts a final state after the scheduling activity performed by system 700. The Nth controller (RAM control$_N$ 802) has moved the two memory requests received at FIG. 7 into the lowest free memory slots of RAM Control$_N$ 802, as depicted. In a similar fashion as shown in FIGS. 6 and 7, Scheduler N 804 selects the oldest memory request and forwards it to the free buffer slot of RAM Control$_1$ 806, as indicated by the upper dashed arrow in FIG. 8. In addition, RAM Control$_1$ 806 contains no row match (or empty row match) between a memory request stored therein and in a row buffer (810, 812, 814, 816) of the RAM memory banks (818, 820, 822, 824). Scheduler 1 808 therefore defaults to the oldest memory request stored in RAM Control$_1$ 806, and selects such request to be fulfilled (as depicted by the lower dashed arrow). As described, FIGS. 6 though 8 depict how a RAM bank state can be utilized to determine a memory request selected by an optimized algorithm such as the FR-FCFS algorithm. In addition, such figures depict how a FCFS algorithm selects memory threads for advancement independent of state of the RAM banks and independent of the operation of the FR-FCFS algorithm. By employing state oriented and state independent schedulers, system 600-800 can provide for increased scalability and reduced implementation complexity while maintaining or increasing memory performance for advanced, parallel processing architectures. Such a benefit can be an important mechanism for improving overall computer performance and enabling new advancements in processor technology to be fully appreciated.

The aforementioned systems have been described with respect to interaction between several components. It should be appreciated that such systems and components can include those components or sub-components specified therein, some of the specified components or sub-components, and/or additional components. For example, a system could include first RAM controller 102, second RAM controller 104, and request routing component 408, or a different combination of these and other components. Sub-components could also be implemented as components communicatively coupled to other components rather than included within parent components. Furthermore, it should be noted that one or more components could be combined into a single component providing aggregate functionality. For instance, cache 406 can include request routing component 408, or vice versa, to facilitate serving initial memory requests in cache and routing requests for un-cached data to a multi-tiered memory control (as described by any suitable foregoing system) by way of a single component. The components may also interact with one or more other components not specifically described herein but known by those of skill in the art.

Furthermore, as will be appreciated, various portions of the disclosed systems above and methods below may include or consist of artificial intelligence or knowledge or rule based components, sub-components, processes, means, methodologies, or mechanisms (e.g., support vector machines, neural networks, expert systems, Bayesian belief networks, fuzzy logic, data fusion engines, classifiers . . . ). Such components, inter alia, and in addition to that already described herein, can automate certain mechanisms or processes performed thereby to make portions of the systems and methods more adaptive as well as efficient and intelligent.

Figure 9:
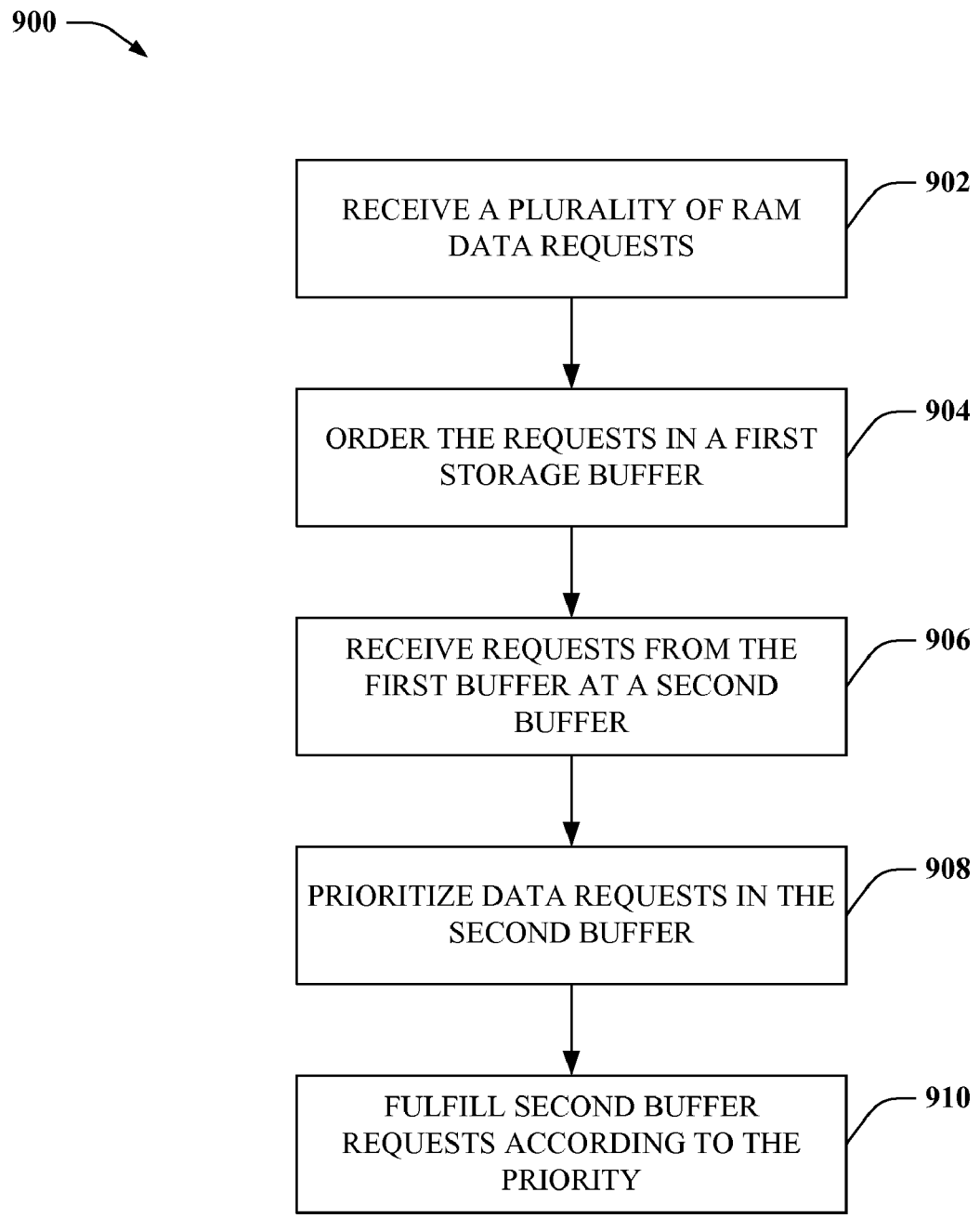
FIG. 9 illustrates an example flowchart of a methodology for providing a multi-tiered RAM request control interface according to various aspects.
Figure 10:
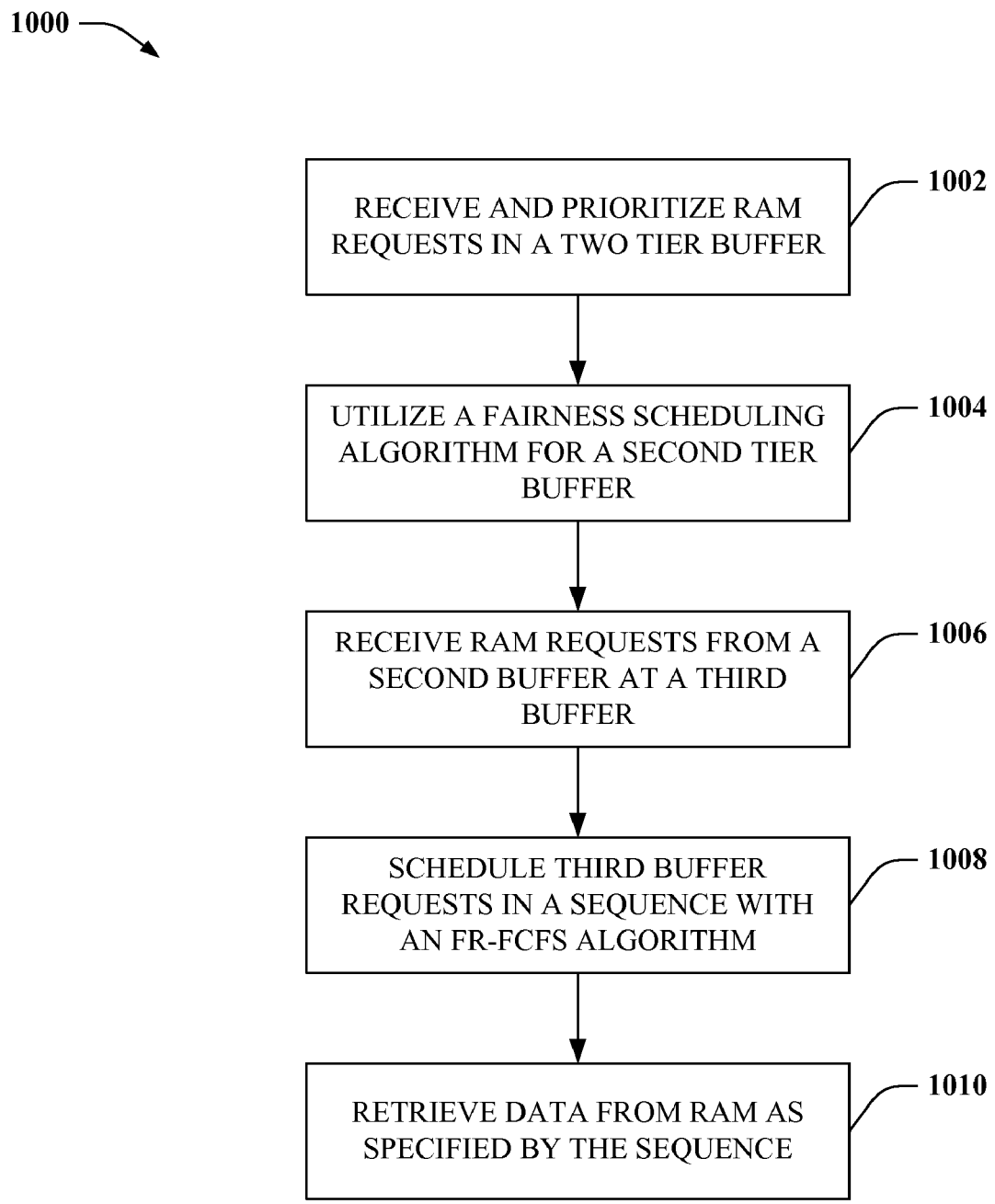
FIG. 10 depicts an example flowchart of a methodology for providing at least first-ready first come first serve scheduling for a 3-tier control architecture.

In view of the exemplary systems described supra, methodologies that may be implemented in accordance with the disclosed subject matter will be better appreciated with reference to the flow charts of FIGS. 9 and 10. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter. Additionally, it should be further appreciated that the methodologies disclosed hereinafter and throughout this specification are capable of being stored on an article of manufacture to facilitate transporting and transferring such methodologies to computers. The term article of manufacture, as used, is intended to encompass a computer program accessible from any computer-readable device, carrier, or media as well as computer hardware including gates, circuits, and transistors, or the like.

Referring now to FIG. 9, a sample methodology is depicted for providing a multi-tiered RAM control for RAM memory in accordance with one or more embodiments disclosed herein. Method 900, at 902, can receive a plurality of RAM data requests. Such RAM data requests can indicate a particular memory bank, and contain a data address (e.g., row and column) sufficient to locate such data in the memory bank. At 904, the requests can be ordered in a first storage buffer. For instance, an FCFS algorithm can be utilized to order the RAM data requests within the first storage buffer such that older requests receive a lower order number than newer requests. Ordering in such a manner can be done by a very simple algorithm, which need not increase in complexity as a function of memory requests stored. Therefore, such an algorithm can be highly scalable, allowing efficient buffering and processing of a large number of memory requests.

At 906, RAM data requests can be received from the first buffer at a second buffer. More specifically, the RAM data requests can be received as a function of lowest order number (indicating first receipt at the first storage buffer as compared with other requests within the first storage buffer) established at reference number 904. At 908, RAM data requests stored in the second buffer can be prioritized. Such prioritization can be independent of the ordering performed at reference number 904, for instance. As an example, the prioritization can be established as a function of a first received (with respect to the second storage buffer) request within the second storage buffer that results in a row match, or results in an empty row match, as described herein. If no such request exists, the prioritization can default priority to the first received request within the second memory buffer. At 910, second buffer requests are fulfilled in an order established by the prioritization. As a result, methodology 900 enables utilization of different scheduling algorithms within a single memory control interface. Consequently, benefits of such algorithms can be combined, for instance, to provide high scalability in conjunction with high memory performance and low memory latency.

Referring now to FIG. 10, an additional example methodology 1000 is depicted for providing at least fairness scheduling in a 3-tier memory controller. Method 1000, at 1002, can receive and prioritize RAM data requests in a two-tier control buffer. For instance, as described herein, a first buffer can receive requests from processor cache and order such requests in a FCFS fashion. The requests can be advanced to the second tier buffer according such order. At 1004, a fairness algorithm can be utilized to further order RAM data requests advanced to the second tier buffer. The fairness algorithm can be an R-R algorithm, or any other suitable scheduling algorithm known in the art that is designed to advance requests of all or particular threads to mitigate thread stalling.

At 1006, RAM data requests can be received from the second buffer at a third buffer. For instance, the requests can be received in an order established by the fairness algorithm implemented at reference number 1004. At 1008, RAM data requests stored in the third buffer can be scheduled in a sequence utilizing a FR-FCFS algorithm, as described herein. At 1010, data can be retrieved from RAM as specified by the sequence generated by the FR-FCFS algorithm (to fulfill RAM data requests in an order specified by the sequence). As a result, methodology 1000 can include a fairness scheduling into a multi-tiered RAM controller that incorporates the benefits of highly scalable scheduling algorithms, high performance scheduling algorithms, and fairness algorithms to provide optimal memory bandwidth, high scalability, and mitigate thread stalling for conventional processing architectures as well as advanced parallel processing architectures.

Figure 11:
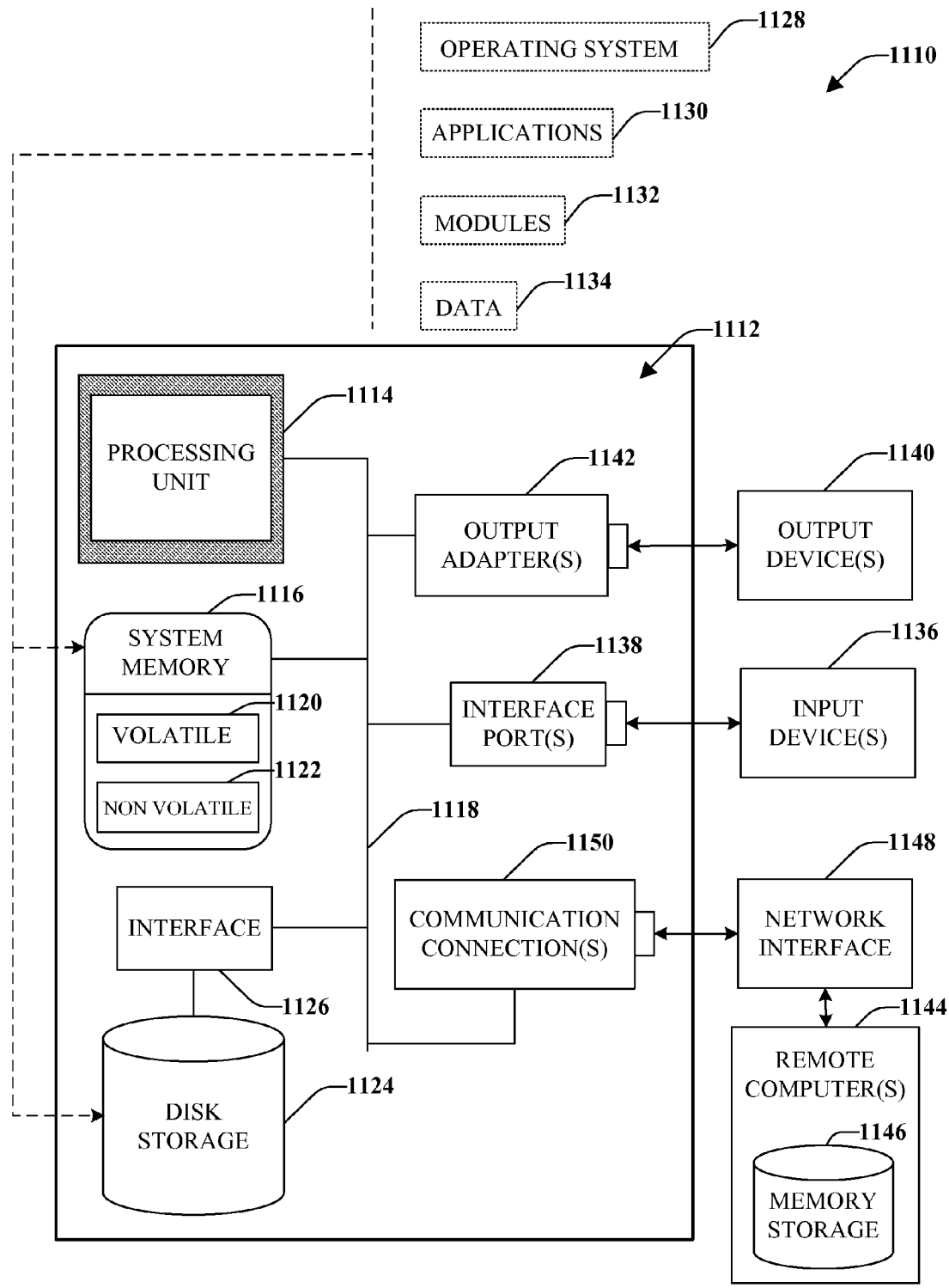
FIG. 11 illustrates an example operating environment utilizing one or more of the aspects disclosed herein.

In order to provide additional context for various aspects of the disclosed subject matter, FIG. 11 as well as the following discussion are intended to provide a brief, general description of a suitable environment in which the various aspects of the disclosed subject matter can be implemented. While the subject matter has been described above in the general context of computer hardware that runs computer-executable instructions of one or more computer programs on a computer and/or computers, those skilled in the art will recognize that the invention also may be implemented in combination with other program modules or other hardware computer architectures.

Generally, program modules include routines, programs, components, data structures, etc. that can perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices (e.g., personal digital assistant (PDA), phone, watch . . . ), microprocessor-based or programmable consumer or industrial electronics, and the like. The illustrated aspects may also be practiced in distributed computing environments where tasks are performed by remote processing devices that are linked through a communications network. However, some, if not all aspects of the invention can be practiced on stand-alone computers. In a distributed computing environment, program modules can be located in both local and remote memory storage devices.

FIG. 11 depicts an exemplary environment 1110 for implementing various aspects disclosed herein and includes at least a computer 1112 (e.g., desktop, laptop, server, hand held, programmable consumer or industrial electronics . . . ). The computer 1112 includes a processing unit 1114, a system memory 1116, and a system bus 1118. The system bus 1118 can couple system components including, but not limited to, the system memory 1116 to the processing unit 11 14. The processing unit 1114 can be any of various microprocessors, such as dual microprocessors, quad microprocessors, and other multiprocessor architectures suitable for a computer environment 1110.

The system bus 1118 can be any of several types of suitable bus structure(s) including the memory bus or memory controller, a peripheral bus or external bus, and/or a local bus using any suitable variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include read only memory (ROM), programmable ROM (PROM), electrically programmable ROM (EPROM), electrically erasable ROM (EEPROM), or flash memory. Volatile memory 1120 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1112 also includes removable/non-removable, volatile/non-volatile computer storage media. FIG. 11 illustrates, for example, disk storage 1124. Disk storage 1124 includes, but is not limited to, devices such as a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used such as interface 1126.

It is to be appreciated that FIG. 11 describes software that acts as an intermediary between users and the basic computer resources described in operating environment 1110. Such software can include an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the present invention can be implemented with various operating systems or combinations of operating systems.

A user can enter commands or information into the computer 1112 through input device(s) 1136. Input devices 1136 can include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 can utilize some of the same type of ports as input device(s) 1136. Thus, for example, a USB port may be used to provide input to computer 1112 and to output information from computer 1112 to an output device 1140. Output adapter 1142 is provided to illustrate that there are some output devices 1140, like displays (e.g., flat panel and CRT), speakers, and printers, and so on, that require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and can typically include many or all of the elements described relative to computer 1112. For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit-switching networks like Integrated Services Digital Networks (ISDN) and variations thereon, packet switching networks, and Digital Subscriber Lines (DSL).

Communication connection(s) 1150 refers to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems, power modems and DSL modems, ISDN adapters, and Ethernet cards or components.

What has been described above includes examples of aspects of the claimed subject matter. It is, of course, not possible to describe every conceivable combination of components or methodologies for purposes of describing the claimed subject matter, but one of ordinary skill in the art may recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" are used in either the detailed description or the claims, such terms are intended to be inclusive in a manner similar to the term "comprising" as "comprising" is interpreted when employed as a transitional word in a claim.

What is claimed is:

1. A system configured to provide multi-tiered access control for random access memory (RAM), comprising:
   means for managing RAM access, wherein the means for managing RAM access is configured to receive a plurality of RAM data requests at a first memory request buffer and prioritize the plurality of RAM data requests within the first memory request buffer;
   means for further managing RAM access, wherein the means for further managing RAM access is configured to sequentially receive RAM data requests from the first memory request buffer at a second memory request buffer and according to a prioritization established by the means for managing RAM access, wherein the means for further managing RAM access orders RAM data requests within the second memory request buffer; and means for retrieving data, wherein the means for retrieving data is configured to fulfill ordered RAM data requests stored within the second memory request buffer based at least in part on an order established by the means for further managing RAM access.

2. The system of claim 1, where the first memory request buffer is larger than the second memory request buffer.

3. The system of claim 1, where the means for managing RAM access employs an algorithm for scaling the first memory request buffer to a larger buffer size to prioritize the plurality of RAM data requests within the first memory request buffer.

4. The system of claim 1, where the means for further managing RAM access employs an optimized algorithm to order the RAM data requests stored in the second memory request buffer.

5. The system of claim 1, further comprising means for additional management of RAM access, wherein the means for additional management of RAM access is configured to receive RAM data requests from the second memory request buffer at a third memory request buffer according to the order established by the means for further managing RAM access, where the third memory buffer is smaller than the first memory buffer and smaller than the second memory buffer, wherein:
the means for additional management of RAM access employs a first ready, first come first serve algorithm to determine a sequence of RAM data requests stored in the third memory buffer; and
RAM data requests stored in the third memory buffer are fulfilled by the means for retrieving data in accordance with the sequence.

6. The system of claim 1, the plurality of RAM data requests are initiated by one or more threads of execution, one or more processors, or one or more cores of at least one multi-core processor, or a combination thereof.

7. The system of claim 1, where at least one of the means for managing RAM access or the means for further managing RAM access employs a first come first serve, a round robin, a first ready first come first serve, a fair queuing, a fair memory, a random selection, or a stall-time fair memory algorithm, or a combination thereof, to prioritize or to order RAM data requests, respectively.

8. A method for buffering and ordering random access memory (RAM) data requests initiated at one or more processors, processor cores, or threads of execution, comprising:
receiving a plurality of RAM data requests at a first storage buffer;
selecting one of the plurality of RAM data requests in the first storage buffer based on a selection algorithm;
receiving selected RAM data requests from the first storage buffer at a second storage buffer;
further selecting at least one of the selected RAM data requests stored within the second storage buffer based on at least one of the selection algorithm or a second selection algorithm; and
fulfilling the at least one of the selected RAM data requests stored within the second storage buffer.

9. The method of claim 8, comprising employing a first come first serve algorithm for at least part of the selection algorithm.

10. The method of claim 8, comprising:
receiving RAM data requests at a third storage buffer that is smaller than the first storage buffer and the second storage buffer;
selecting a RAM data request queued within the third storage buffer based at least in part upon a first ready first come first serve algorithm; and
retrieving data from a RAM module to fulfill the RAM data request queued within the third storage buffer.

11. The method of claim 8, comprising employing a round robin algorithm for at least part of the second selection algorithm.

12. The method of claim 8, wherein the plurality of RAM data requests are initiated by one or more processors, processor cores, or threads of execution, or a combination thereof.

* * * * *